E. A. HALLAM.
MOTOR TRUCK.
APPLICATION FILED NOV. 13, 1919.
1,387,392.
Patented Aug. 9, 1921.
2 SHEETS—SHEET 2.
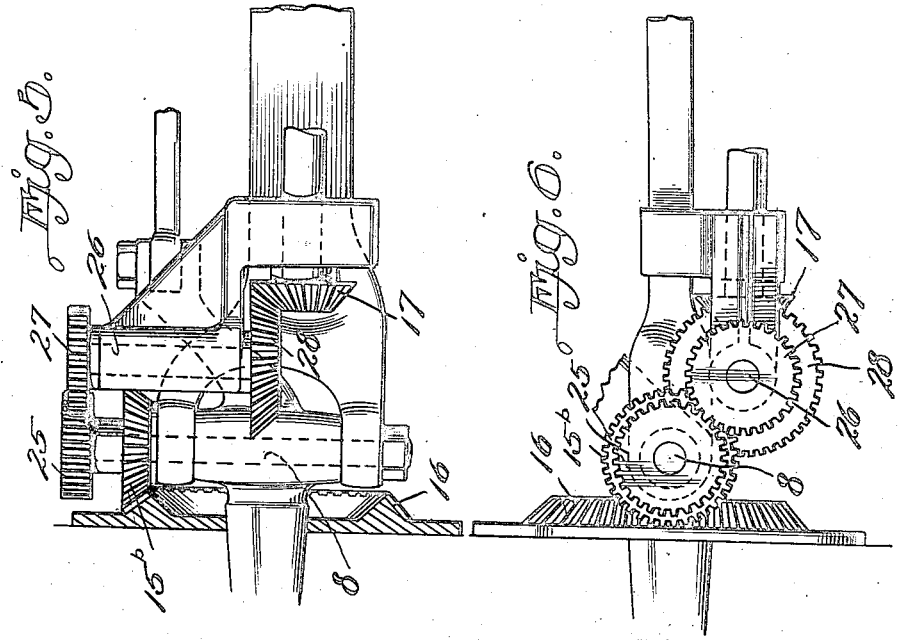

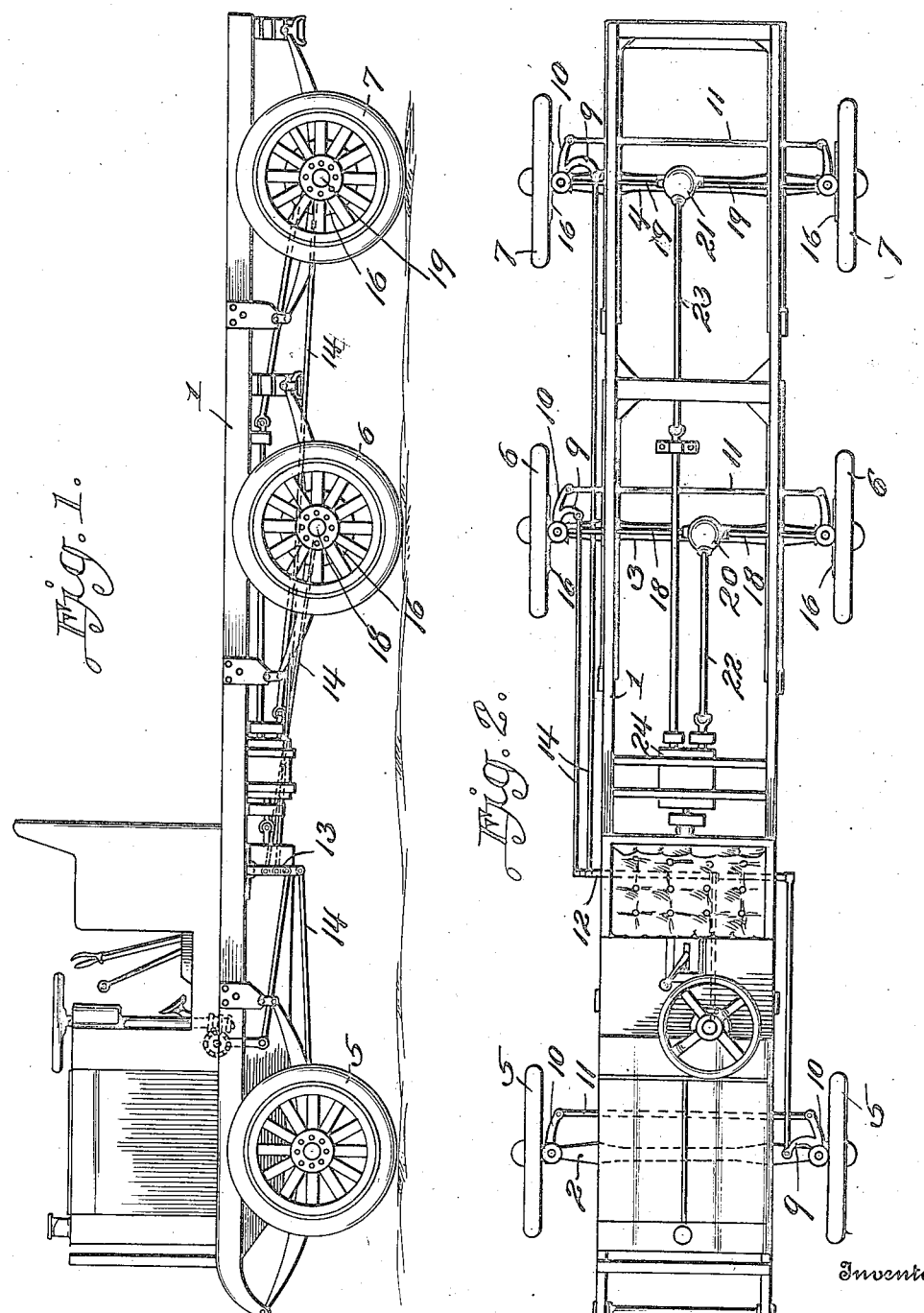

UNITED STATES PATENT OFFICE.

EDWIN A. HALLAM, OF PORTLAND, OREGON.

MOTOR-TRUCK.

1,387,392.  Specification of Letters Patent.  Patented Aug. 9, 1921.

Application filed November 13, 1919. Serial No. 337,756.

*To all whom it may concern:*

Be it known that I, EDWIN A. HALLAM, a citizen of the United States, residing at Portland, in the county of Multnomah and State of Oregon, have invented new and useful Improvements in Motor-Trucks, of which the following is a specification.

This invention relates to improvements in motor trucks and its principal objects are the substantial reduction of road shocks, the increase of load capacity, the reduction of the cost of tire equipment, the advantageous distribution of the weight of the load, and the increase of the points and degree of traction.

With the above objects in view, the invention consists generally in the provision of a rigid frame carrying six wheels on three axles wherein four wheels, preferably located back of the center of the truck, are drive wheels and all six wheels are arranged to be turned for steering purposes. The invention further consists in the structural arrangements for the application of power to the drive wheels and for turning the several wheels in steering as well as in various other details of structure and combination which will be set forth as the description proceeds.

A truck in which the features of the invention are incorporated is illustrated in the accompanying drawings, wherein:—

Figure 1 is a side elevation.

Fig. 2 is a plan view.

Fig. 3 is a rear elevation.

Fig. 4 is a detail elevation of the gearing associated with each of the driving wheels.

Fig. 5 is a detail elevation showing gearing of a slightly different form and which enables a variation in the arrangement of the transverse driving shaft.

Fig. 6 is a plan view of the same.

Similar characters of reference designate corresponding parts throughout the several views.

The frame 1 is rigid throughout the extent of the truck and is supported from three axles 2, 3 and 4 which carry, respectively, the front wheels 5, the intermediate wheels 6 and the rear wheels 7. The axles are connected to the frame 1 by springs of any suitable form, the standard arrangement of semi-elliptic springs at the front and platform springs at the rear being shown and preferred. All of the wheels are utilized for steering, the standard mounting of steering wheels being preferably employed. Thus each wheel is mounted to turn about a king pin 8 and one wheel of each pair has an actuating arm 9 while both wheels have coupling arms 10, these being connected to a transverse coupling rod 11. The steering wheel, within easy reach of the driver's seat, is suitably geared to a transverse shaft 12 having depending arms 13 which are connected by links 14 to the respective actuating arms 9. When making a turn, the front wheels 5 turn, as usual, in the direction in which it is intended that the vehicle shall move and the other two pairs of wheels 6 and 7 turn in the opposite direction, causing the truck practically to turn on its body as a center and thus insuring a very short turn. The front and rear pairs of wheels 5 and 7 can turn on the same radius and thus the rear wheels 7 may be caused to follow in the track of the front wheels 5; the intermediate wheels 6 must, obviously turn about a shorter radius and this is provided for by a proportionate reduction of the length of the arm 13 by which the wheels 6 are actuated.

The driving power is applied to each of the wheels 6 and 7 by gearing (Fig. 4) which includes a driving pinion 17 in mesh with bevel pinion 15 mounted coaxially with the king-pin and connected by a sleeve 15$^a$ to another bevel pinion 15$^b$ in mesh with a bevel pinion 16 mounted concentrically on the wheel. The pinions 17 are mounted at the ends of transverse shafts of which two, as 18, are employed for driving the wheels 6 and two, as 19, are employed for driving the wheels 7. The shafts 18 and 19 extend from differential systems 20 and 21 of any usual and approved construction and which are shown only conventionally in the drawings. The differential systems 20 and 21 are driven by longitudinal shafts 22 and 23 which extend from a differential system 24 in turn driven by the motor shaft and preferably located toward the front of the vehicle.

In Figs. 1, 2 and 3, the shafts 18 and 19 are arranged above the respective axles 3 and 4. In some cases, where a lower arrangement of the load may be desirable, the shafts 18 and 19 may be located in front or rear of the respective axles 3 and 4 and under the springs to which said axles are connected; for such adaptation the gearing shown in Figs. 5 and 6 may be employed.

In this alternative construction the pinion 15 is omitted and the pinion 15ᵇ is fastened to or formed integral with a spur wheel 25, both of which turn together on the king-pin 8; and the gearing includes a vertical shaft 26 provided at its upper end with a spur wheel 27 which meshes with the pinion 25 and at its lower end with a bevel pinion 28 which meshes with the pinion 17. The arrangement of driving and steering wheels in relation to a single rigid frame, as disclosed, enables the substantial reduction of road shocks, the substantial increase of the loading capacity, the reduction of the cost of tire equipment relatively to a load of maximum capacity, the distribution of the load whereby either of the driving wheels may act in coöperation with the front wheels in the support of the load; thus enabling the drivers to have easy passage over ruts or like irregularities, and the doubling of the points of traction as also the doubling of the amount of traction as compared with any two-wheel-drive truck using tires of the same size.

Having fully described my invention, I claim:—

1. A motor truck comprising a single rigid frame, three dead axles, springs connecting said frame and axles, a pair of spindles for each axle, each spindle having a wheel rotatably mounted thereon, king pins for pivotally connecting the spindles to each axle, a bevel gear secured to each wheel of the two rearmost axles, gearing rotatably mounted on the king pins of the spindles of the two rearmost axles, said gearing including a bevel pinion adapted to mesh with said bevel gear, means for driving said gearing including a separate differential mechanism for each pair of traction wheels, and means connected with said spindles for steering all of said wheels.

2. A motor truck comprising a single rigid frame, forward, intermediate and rear axles, springs connecting said frame and axles, a pair of wheels on each axle, each wheel being pivotally mounted for steering purposes, and steering mechanism for simultaneously turning the forward wheels in an opposite direction from the intermediate and rear wheels and said intermediate and rear wheels to a different angular extent, and means for applying driving power to the intermediate and rearmost wheels.

3. A motor truck comprising a single rigid frame, three dead axles, springs connecting said frame and axles, a pair of wheels for each axle, each wheel being pivotally connected to the corresponding axle for steering purposes, gear wheels secured to the intermediate and rearmost wheels, and means for applying driving power directly to said gear wheels.

4. In a motor truck, two pairs of wheels mounted to turn about vertical axes, the one pair having a longer turning radius than the other, one wheel of each pair having an actuating arm, a transverse operating shaft having depending arms, and links extending between said depending arms and said actuating arms, the depending arm which is linked to the pair of wheels having the shorter turning radius being proportionately shorter than the other arm.

In testimony whereof I have hereunto set my hand in presence of two subscribing witnesses.

EDWIN A. HALLAM.

Witnesses:
MARGARET M. BLAKE,
CAROLINE R. CASEY.